(12) United States Patent
Wang et al.

(10) Patent No.: US 10,915,637 B2
(45) Date of Patent: Feb. 9, 2021

(54) METHOD, CLIENT, AND SYSTEM FOR TESTING APPLICATION

(71) Applicant: Tencent Technology (Shenzhen) Company Limited, Guangdong (CN)

(72) Inventors: Jinding Wang, Shenzhen (CN); Yue Gao, Shenzhen (CN); Fan Shao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 196 days.

(21) Appl. No.: 15/801,934

(22) Filed: Nov. 2, 2017

(65) Prior Publication Data
US 2018/0144140 A1 May 24, 2018

Related U.S. Application Data

(63) Continuation of application No. PCT/CN2016/083106, filed on May 24, 2016.

(30) Foreign Application Priority Data

Jul. 14, 2015 (CN) .......................... 2015 1 0412588

(51) Int. Cl.
*G06F 21/00* (2013.01)
*G06F 21/57* (2013.01)
(Continued)

(52) U.S. Cl.
CPC .......... *G06F 21/577* (2013.01); *G06F 16/986* (2019.01); *G06F 21/57* (2013.01);
(Continued)

(58) Field of Classification Search
CPC .................. G06F 21/577; G06F 16/986; G06F 2221/033; H04L 63/1433
See application file for complete search history.

(56) References Cited

U.S. PATENT DOCUMENTS 8,578,482 B1  11/2013  Yang et al.
8,949,990 B1   2/2015  Hsieh et al.
(Continued)

FOREIGN PATENT DOCUMENTS

CN  103281177 A  9/2013
CN  104063309 A  9/2014

OTHER PUBLICATIONS

International Search Report for Application No. PCT/CN2016/083106 dated Aug. 30, 2016.
(Continued)

*Primary Examiner* — Shewaye Gelagay
*Assistant Examiner* — Michael M Lee
(74) *Attorney, Agent, or Firm* — Anova Law Group, PLLC

(57) ABSTRACT

A method, a client, and a system for testing an application. A webpage file includes codes for simulating a malicious attack. The method includes providing, by the test client, a network address of the webpage file to the tested application, wherein when the tested application loads the webpage file according to the network address, the tested application executes the codes comprised in the webpage file to attempt to read content of a private file in a private directory of the tested application. When the tested application successfully reads the content of the private file, the tested application transmits a message carrying the content of the private file to a test server through a local terminal device, wherein the test server determines whether the tested application has a security loophole according to the message transmitted by the tested application.

13 Claims, 5 Drawing Sheets

(51) Int. Cl.
*G06F 16/958* (2019.01)
*H04L 29/06* (2006.01)
(52) U.S. Cl.
CPC .... *H04L 63/1433* (2013.01); *G06F 2221/033* (2013.01); *G06F 2221/2115* (2013.01)

(56) References Cited

U.S. PATENT DOCUMENTS

| | | | |
|---|---|---|---|
| 2005/0222815 A1* | 10/2005 | Tolly | H04L 43/50 702/185 |
| 2012/0304296 A1* | 11/2012 | Shulman | H04L 63/1433 726/23 |
| 2013/0144846 A1* | 6/2013 | Chhaunker | G06F 7/00 707/692 |
| 2014/0189863 A1 | 7/2014 | Rorabaugh et al. | |
| 2014/0298301 A1* | 10/2014 | Lindahl | G06F 11/3636 717/128 |
| 2016/0110547 A1* | 4/2016 | Dawson | H04L 63/1433 726/25 |

OTHER PUBLICATIONS

Extended European Search Report for Application No. 16823728.7, dated Mar. 22, 2018.
International Preliminary Report on Patentability for Application No. PCT/CN2016/083106, dated Jan. 16, 2018.

* cited by examiner

METHOD, CLIENT, AND SYSTEM FOR TESTING APPLICATION

CROSS-REFERENCE TO RELATED APPLICATIONS

This application is a continuation of International Application No. PCT/CN2016/083106, filed on May 24, 2016. This application claims the benefit and priority of Chinese Application No. CN201510412588.6, filed on Jul. 14, 2015. The entire disclosures of each of the above applications are incorporated herein by reference.

FIELD

The present disclosure relates to computer system testing techniques, and to a method, client, and system for testing an application.

BACKGROUND

This section provides background information related to the present disclosure which is not necessarily prior art.

Conventional personal computer (PC) clients browse contents and receive services provided by remote ends, such as news, searching services, and social services via browsers. It is similar for mobile terminal clients based on Android, iOS systems. For example, an Android client may have two ways in which to receive a remote service, one is similar to a conventional PC client, i.e. receive the remote service via a browser (may be a browser provided by the Android system or a third party browser) provided by the Android client, the other receives the remote service via a built-in browser component of an application (APP) installed in the Android client. This kind of APP may also be referred to as an APP with a built-in browser component. Currently, the second method is more widely used. For example, APPs such as mobile QQ, WeChat and microblog receive remote services via their respective built-in browser component.

Currently, the number of APPs applicable for mobile terminals (such as APPs for Android clients) grows rapidly. APPs in various categories emerge with numerous options. Securing the APPs has challenges due to the lack of standard management and access principles, especially for the APPs based on an open operating system platform. For example, various APPs for the Android system, browser security challenges may be particularly prominent. Browser security loopholes of many APPs may threaten the private data of users. The private data may be stolen by a locally installed malicious application or even controlled or used by a remote, malicious, third party application. For example, a local malicious application or a remote third party application may maliciously attack to the browser or a browser component inside an APP to make them load a malicious webpage file, and then seize the content of a private file (e.g., user account, chat history, transaction history, etc.) of the browser or the APP.

SUMMARY

This section provides a general summary of the disclosure, and is not a comprehensive disclosure of its full scope or all of its features.

Various embodiments of the present disclosure provide a method for testing an application, wherein the application being tested is a browser or an application with a built-in browser component. A webpage file is created in advance. The webpage file includes codes for simulating a malicious attack behavior and is executable by the application being tested. The method is applicable for a test client. When the test is performed, the method includes the test client providing, by the test client, a network address of the webpage file to the tested application, wherein when the tested application loads the webpage file according to the network address, the tested application executes the codes comprised in the webpage file to read content of a private file in a private directory of the tested application. If the tested application successfully reads the content of the private file, the tested application transmits a message carrying the content of the private file to a test server through a local terminal device where the tested application is located, wherein the test server determines whether the tested application has a security loophole according to the message transmitted by the tested application.

Various embodiments of the present disclosure also provide a client for testing an application. The application being tested is a browser or an application with a built-in browser component. The client includes at least an address providing module, which provides a network address of a webpage file to the tested application, where the webpage file is created in advance and is comprised of codes for simulating a malicious attack, which are executable by the tested application, wherein when the tested application loads the webpage file according to the network address, the tested application executes the codes comprised in the webpage file to read content of a private file in a private directory of the tested application. If the tested application successfully reads the content of the private file, the tested application transmits a message carrying the content of the private file to a test server through a local terminal device where the tested application is located, wherein the test server determines whether the tested application has a security loophole according to the message transmitted by the tested application Various embodiments of the present disclosure further provide a system for testing an application. To test at least one application, the tested application is a browser or an application within a built-in browser component, and the test system includes at least one of a test client and a test server; wherein each of the at least one test client provides a network address of a webpage file to one of the at least one tested application. The webpage file is created in advance and is comprised of codes for simulating a malicious attack and is executable by the tested application. The one of the at least one tested application executes, when loading the webpage file according to the rework address, the codes in the webpage file to read content of a private file in a private directory of the tested application. If the content of the private file is read, the tested application transmits a message carrying the content of the private file to the test server through a local terminal device. The test server determines, according to the message transmitted by the one of the at least one tested application, whether the tested application has a security loophole.

The method, client, and system for testing applications provided by the various embodiments of the present disclosure provide dynamic and automatic testing, and improve testing efficiency and accuracy.

Further areas of applicability will become apparent from the description provided herein. The description and examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Hereinafter, the drawings used in the examples of the present disclosure are briefly described to make the technical solution of the examples of the present disclosure clearer. It should be noted that, the following figures are merely some examples of the present disclosure. Those with ordinary skill in the art may obtain other figures based on the following.

Corresponding reference numerals indicate corresponding parts throughout the several views of the drawings.

DETAILED DESCRIPTION

Example embodiments will now be described more fully with reference to the accompanying drawings.

Hereinafter, the solution of the present disclosure is described in further detail with reference to the accompanying drawings. The following are merely some examples of the present disclosure and do not form all examples of the present disclosure. Based on the following, those with ordinary skill may obtain other examples, and those are also within the protection scope of the present disclosure.

Figure 1:
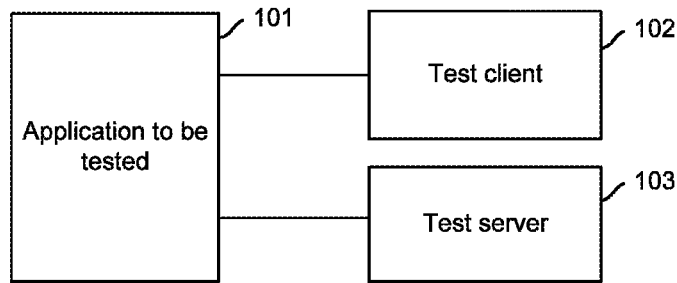
FIG. 1 is a block diagram illustrating an implementation environment according to various examples of the present disclosure.

FIG. 1 is a block diagram illustrating an implementation environment according to various examples of the present disclosure. As shown in FIG. 1, the testing system includes an APP 101 waiting for testing, a test client 102, and a test server 103. APP 101 may be installed in a mobile terminal with an Android system, an iOS system, or a PC client equipped with Windows system. APP 101 may be a browser provided by the operating system, or an APP with a built-in browser component installed in the operating system.

APP 101 may be in the same location as the test client 102, or may communicate remotely with the test client 102 via a network connection. The test client 102 is configured to provide a network address of a malicious webpage file to APP 101, so as to simulate a malicious attack to APP 101. After the attack, a response message generated by tested APP 101 may be transmitted to the test server 103. The test server 103 analyzes the received message to determine a test result, which may include whether APP 101 is capable of resisting the malicious attack (whether APP 101 has a security loophole) and the type of the security loophole, etc.

In various embodiments of the present disclosure, the test server 103 may remotely communicate with tested APP 101 via a network, or have a local communication with tested APP 101. The test server 103 may also have remote or local communications with the test client 102, which is not restricted in the present disclosure.

Tested APP 101, the test client 102, and the test server 103 may be implemented via software or hardware, or a combination thereof. They may be configured in the same or different locations. Any one of APP 101, test client 102, and test server 103 may be configured in a device having data computing and processing capabilities, including but not limited to a personal computer, smart phone, palm computer, tablet computer, etc.

Figure 2:
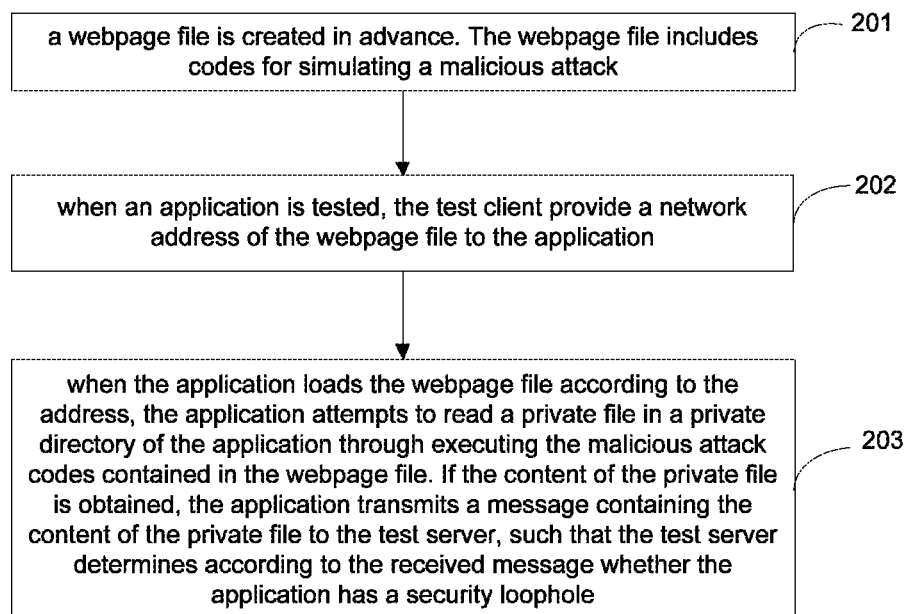
FIG. 2 is a flowchart illustrating a testing method according to various examples of the present disclosure.

Based on the foregoing, the testing method provided by the various embodiments of the present disclosure is described hereinafter with reference to the accompanying drawings. As shown in FIG. 2, the testing method includes the following.

Block 201: a webpage file is created in advance. The webpage file includes codes for simulating a malicious attack. The webpage file may be also referred to as a malicious webpage file. The webpage file may be a hypertext markup language (HTML) file, and the codes contained in it are executable by a browser or a browser component.

Block 202: when APP 101 is tested, the test client 102 provides a network address (such as a URL) of the webpage file generated in block 201 to APP 101.

If APP 101 is in a local entity of the test client 102, the test client 102 may provide the address of the webpage file to APP 101 via a local calling manner. If APP 101 is remote from the test client 102, the test client 102 may transmit the address of the webpage file to APP 101 remotely via the network.

In various embodiments, APP 101 is in a terminal device and is one of the applications installed in the Android system of the terminal device. The test client 102 is also in the terminal device and is a malicious application installed in the Android system. The test client 102 may attempt to call APP 101 via an internal communication message of the operating system, such as an intent message of the Android system, and provides the address of the webpage file to APP 101. If the test client 102 successfully calls APP 101 via the internal communication message of the operating system, such as an instant message, the address of the webpage file may be transmitted to APP 101 via the internal communication message. Some applications may have a security protection mechanism. Thus, APP 101 may not be successfully called by the test client 102. At this time, the address of the webpage file is not successfully transmitted to APP 101. As such, APP 101 cannot obtain private files in a particular directory.

Block 203: when APP 101 loads the webpage file according to the address, APP 101 attempts to read a private file in a private directory of APP 101 through executing the malicious attack codes contained in the webpage file. If the content of the private file is obtained, APP 101 transmits a message containing the content of the private file to the test server 103, such that the test server 103 determines, according to the received message, whether APP 101 has a security loophole. If APP 101 is remote from the test server 103, APP 101 may transmit the message to the test server 103 via the terminal device where it is located in the network.

According to various embodiments, each application installed in the terminal device has its own installation directory, also referred to as a private directory. Files saved in the private directory of the application are private files, and are readable, writable and executable by the application by default. Some applications may have certain security protection capabilities. Thus, APP 101 may be unable to read the content of the private file. At this time, APP 101 may transmit a message indicating that the content of the private file is not read to the test server 103. After receiving the message from APP 101, the test server 103 may analyze the message (e.g., recognize indication information carried in the message and/or perform characteristic matching to the content carried in the message), so as to determine whether APP 101 has read the content of the private file (i.e., whether the current malicious attack is successful). If the content of the private file is read, it indicates that APP 101 has a security loophole.

Through the above example, it is possible to implement dynamic and automatic tests during the running of the tested application, no human operations are necessary, and testing efficiency and accuracy are improved.

According to various embodiments, the codes of the webpage file may be used for simulating a more secret attack. When APP 101 loads the webpage file via the address of the webpage file, APP 101 executes part of the codes of the webpage file to display a preconfigured page and postpone the execution of the remaining codes for a predefined time length. Since APP 101 displays the preconfigured page while loading the webpage file, the user does not sense the attack of the webpage file due to the existence of the preconfigured page and, thus, cannot take action for protection in time. After the predefined time length expires, APP 101 executes the remaining codes of the webpage file to attempt to read the content of the private file in its private directory.

The testing method provided by the present disclosure is able to simulate various kinds of malicious attacks, including a local calling attack, remote transmission attack, intermediate interception attack, etc., so as to perform various tests to determine the protection capability of the tested application. Hereinafter, the testing methods for the above three kinds of malicious attacks are described with reference to accompanying drawings.

Testing by simulating a local calling attack.

In this case, the test client 102 is located in a local terminal device of the tested application (tested APP) 101. The test client 102 simulates attack behaviors of a local malicious application to tested APP 101. The webpage file is created in a private directory of the test client 102 of the local terminal device, and its attribute is configured as writable, readable, and executable by a third party. Thus, tested APP 101 is able to load the webpage file.

Figure 3:
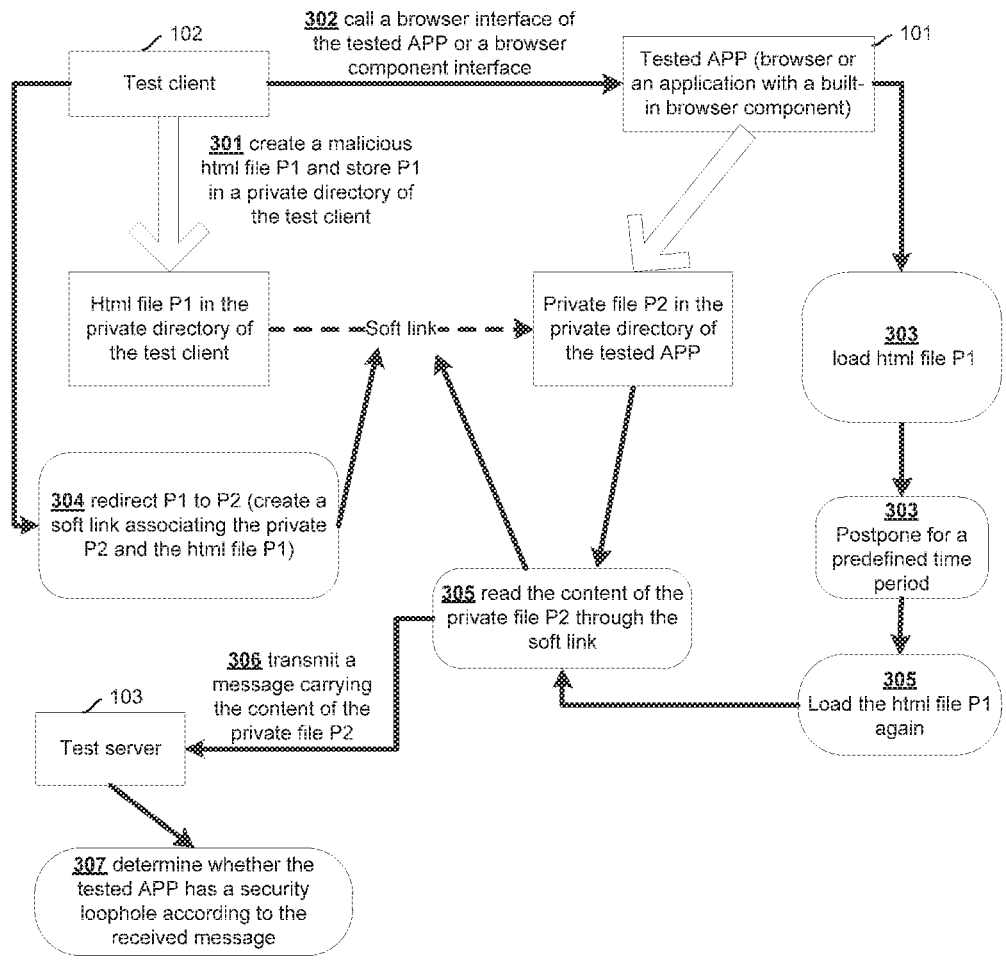
FIG. 3 is a flowchart illustrating a testing method by simulating a local calling attack according to various examples of the present disclosure.

As shown in FIG. 3, the testing method by simulating a local calling attack according to various embodiments of the present disclosure includes the following.

Block 301: a malicious html file P1 is created in advance. The html file P1 includes codes for simulating a local calling attack, and the html file P1 is stored in a private directory of the test client 102 of the local terminal device.

Block 302: the test client 102 attempts to call tested APP 101 via an internal communication message of its operating system and to transmit the address of the html file P1 (the address of the private directory where the html file P1 is stored in the test client 102).

Herein, if the test client 102 and tested APP 101 are installed in an Android client, an instant message of the Android platform may be used for calling tested APP 101. If tested APP 101 is a browser, what is called is a browser interface of tested APP 101. If tested APP 101 is an APP with a built-in browser component, what is called is a browser component interface of tested APP 101.

For the browser or APP with the built-in browser component, in addition to supporting remote access to remote service via URL, they may by default support loading browser page files in a local file system according to a local file access protocol (i.e. file protocol). The URL of such page files begins with "file://". For example, after receiving or downloading a file, the Android client loads a page file via the browser or the browser component built in APP to display the file. At this time, the browser or the browser component built in APP supports the file protocol to implement this function. In block 302, the address provided by the test client 102 to tested APP via the local calling may be a URL that begins with "file://", e.g., "file:///data/data/com.example.test/P1" (at this time, the html file P1 is stored in a directory "/data/data/com.example.test"), or "file:///data/data.com.tencent.mobileqq/aaa.html" (at this time, the html file P1 is stored in the directory "/data/data/com.tencent.mobileqq"), etc.

Block 303: if tested APP 101 is successfully called and the address of the html file P1 is imported, tested APP 101 accesses the locally stored html file P1 and loads the html file P1 according to the address, so as to execute the codes in the html file P1.

According to various embodiments, block 304 may be executed simultaneously with block 303. If the test client 102 successfully calls tested APP 101 and transmits the address of the html file P1, the test client 102 deletes the locally stored html file P1, and creates a soft link associating a private file P2 in the private directory of tested APP 101 with the html file P1 according to an operating system command and the address of the html file P1, i.e., redirect the html file P1 to the private file P2. If the test client 102 and tested APP are installed in an Android client, a Linux soft link command (ln -s) may be used to create the above soft link. In block 305, after the soft link is successfully created in the test client 102, tested APP 101 executes the codes in the html file P1 to attempt to read the content of the private file P2 via the soft link. Tested APP 101 has obtained the address of the html file P1 and the soft link associating the private file P2 to the html file P1 has been created in block 304. When loading the file via the address, tested APP 101 actually loaded the private file P2 via the soft link, so as to try to read the content of the private file P2.

According to various embodiments, in block 303, after tested APP 101 accesses the locally stored html file P1 and loads the html file P1 according to the address, the method further includes the following. Tested APP 101 executes part of the codes in the html file P1 to display a preconfigured page and postpone execution of the remaining codes for a predefined period of time. The preconfigured page may be configured with any form. It simulates a secret attack where the user is unaware that tested APP 101 is being attacked. The codes of the html file P1 include two parts. In one part, once tested APP 101 has downloaded these codes from the test client 102, tested APP 101 executes these codes and renders the preconfigured webpage according to the codes. For the other codes, after these codes are downloaded from the test client 102, tested APP 101 postpones the execution of them for a predefined period of time. When the predefined time period expires, these codes are executed. Thus, a two-phase webpage loads by tested APP 101. In the first phase, tested APP executes part of the codes of the html file P1 to display the preconfigured webpage. In the second phase, tested APP 101 executes the remaining codes of the html file P1 to read the content of the private file P2. During the pendency of the postponed execution of the remaining codes at tested APP 101, the test client 102 executes the above block 304 to attempt to create the above soft link. When the predefined time period expires, block 305 is executed and tested APP 101 loads the file again through executing the remaining codes in the html file P1. At this time, if the test client 102 has successfully created the soft link, tested APP 101 loads the private file P2 via the soft link and, thus, is able to read the content of the private file P2.

Block 304: when the test client 102 attempts to create the soft link associating the private file P2 in the private directory of tested APP 101 with the html file P1, the test client 102 attempts to create the soft link according to the preconfigured address of the private directory of the private file P2 and the network address of the html file P1. It is possible to determine the directory address of the private file according to the type of tested APP 101 and the type of the private file. As such, the directory address of the private file may be preconfigured in the test client 102. For example, the private file is usually a document saving data in the directory of tested APP 101, such as a DB data file. For tested APP installed in the Android client, the directory address of the private file can be determined in advance. For example, for facilitating the normalization of testing operations, the directory address of the hosts file "/data/data/tested APP directory/../../../../hosts" may be taken as the private directory address of the private file designated during the test.

Block 306: after tested APP 101 successfully reads the content of the private file P2, tested APP 101 transmits a message carrying the content of the private file P2 to the test server. Further, if tested APP 101 does not successfully read the content of the private file P2, the test client 102 may also transmit a message to the test server 103, indicating that the content of the private file P2 is not read. If any one of blocks 302 to 305 is not successfully executed, tested APP 101 does not successfully read the content of the private file P2.

Block 307: the test server 103 receives a message from tested APP 101 and determines whether tested APP 101 has read the content of the private file P2 through analyzing the message, so as to determine whether tested APP 101 has a security loophole. The test server 103 may analyze the content of the received message and perform a characteristic matching operation to the content of the message. If it is determined through analyzing the message that private data (user account, password, chat history, bank account, transaction history, etc.) is obtained, it indicates that tested APP 101 has read the content of the private file P2 and tested APP 101 cannot resist the current local calling attack and tested APP 101 has a security loophole. If an indication indicating that content of the private file P2 cannot be read is obtained through analyzing the message, it indicates that the local calling attack simulated by the testing method does not successfully seize the private data of tested APP 101. Tested APP 101 is able to resist this kind of malicious attack and does not have a security loophole.

Testing by simulating a remote transmission attack.

In this case, the test client 102 is located in a remote terminal device remote from tested APP 101 and can simulate an attack behavior of a remote malicious application to tested APP 101. The above webpage file is created in any site device in the network, and the site device may be any remote network device that can be accessed by the local terminal device where tested APP 101 is located.

Figure 4:
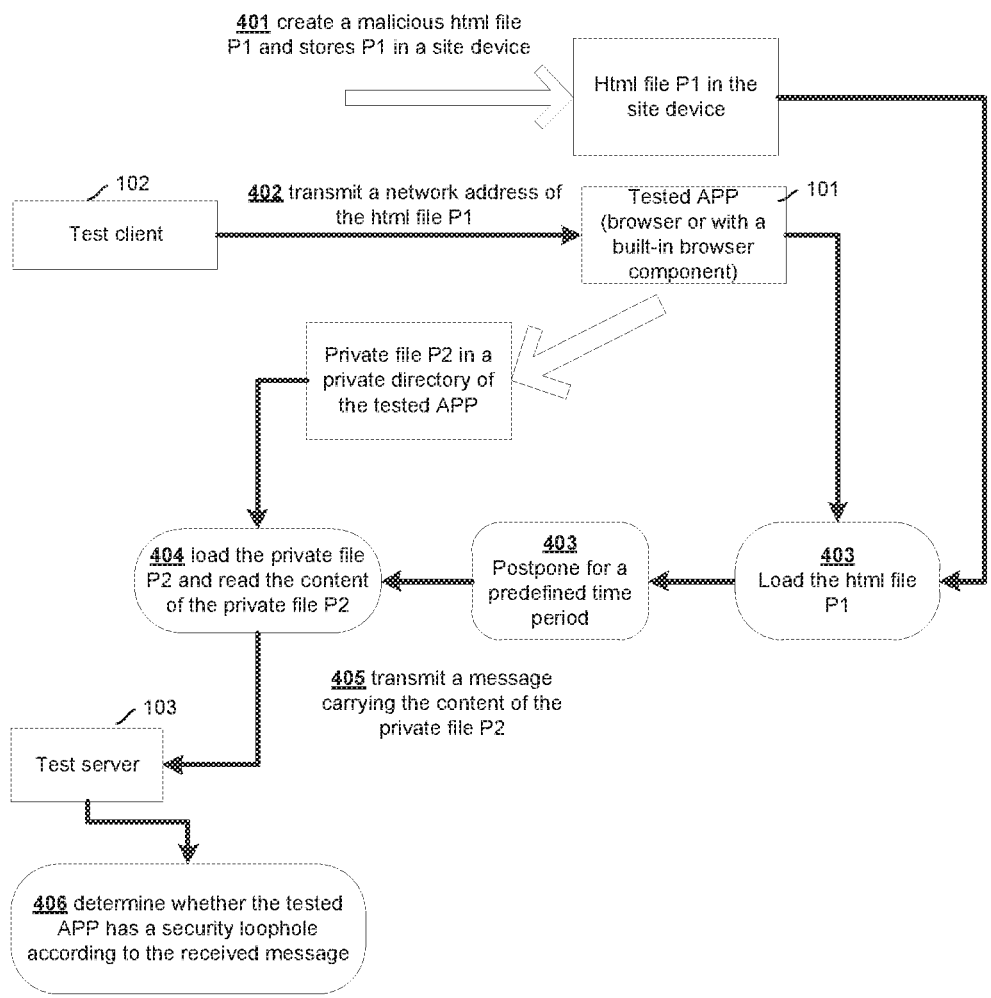
FIG. 4 is a flowchart illustrating a testing method by simulating a remote transmission attack according to various examples of the present disclosure.

As shown in FIG. 4, the testing method of simulating a remote transmission attack provided by various embodiments of the present disclosure includes the following.

Block 401: a malicious html file P1 is created in advance, the html file P1 includes codes for simulating the remote transmission attack and further includes a private directory address where a private file P2 of tested APP 101 is saved, and the html file P1 is stored in any site device in the network.

In block 402, the test client 102 transmits the network address of the html file P1 to tested APP 101 via the network.

Block 403: if tested APP 101 successfully receives the network address of the html file P1, tested APP 101 accesses and loads the html file P1 stored in the site device according to the network address, and executes the codes in the html file P1.

Block 404: tested APP 101 executes the codes in the html file P1 to try to load the private file P2 according to the private directory address contained in the html file P1, so as to read the content of the private file P2.

According to various embodiments, in block 403, after tested APP 101 loads the html file P1 according to the network address, the method further includes where tested APP 101 displays a preconfigured page through executing some of the codes of the html file P1 and tries to load the private file P2 through executing the remaining codes of the html file P1. According to various embodiments, tested APP 101 postpones execution of the remaining codes (the codes for loading the private file P2) of the html file P1 for a predefined period of time. When the predefined period of time expires, block 404 is executed. Through displaying the preconfigured page, a more secretive malicious attack can be simulated. Thus, the user cannot sense the attack of the html file P1 when loading the html file P1 for the first time.

Block 405: after successfully reading the content of the private file P2, tested APP 101 transmits a message carrying the content of the private file P2 to the test server. Further, if tested APP 101 does not successfully read the content of the private file P2, it may also transmit a message to the test server 103, indicating that it does not read the content of the private file P2. If any one of the blocks 402 through 404 is not successfully executed, tested APP 101 does not successfully read the content of the private file P2.

Block 406: the test server 103 receives the message from tested APP 101, determines whether tested APP 101 has read the content of the private file P2 through analyzing the message, and determines whether tested APP 101 has a security loophole.

The detailed implementation of blocks 405 and 406 are similar to those of blocks 306 and 307, which are not repeated herein.

Testing by simulating an intermediate interception attack.

In this case, the test client 102 is located in a remote client device with respect to tested APP 101. The test client 102 may simulate attack behavior of a remote malicious application to tested APP 101. The above webpage file is created in any site device in the network. The site device may be any remote network device that can be accessed by the local terminal device where tested APP 101 is located.

Figure 5:
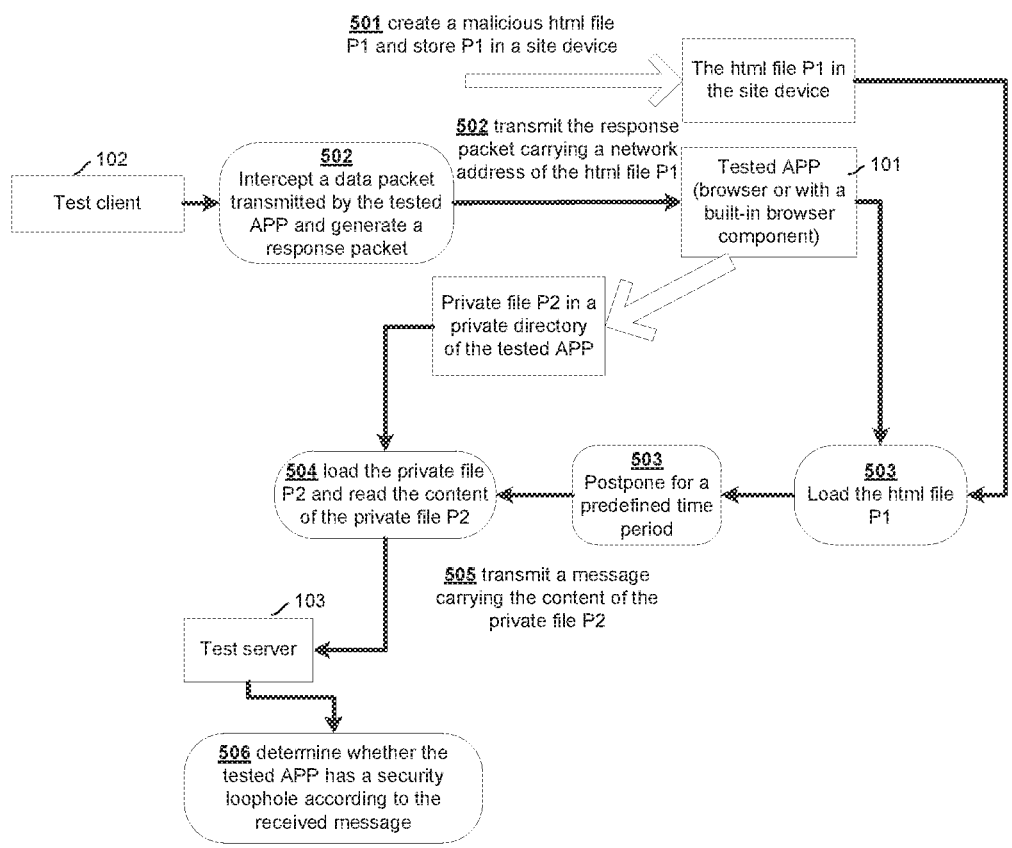
FIG. 5 is a flowchart illustrating a testing method by simulating an intermediate interception attack according to various examples of the present disclosure.

As shown in FIG. 5, the testing method of simulating an intermediate interception attack provided by various embodiments of the present disclosure includes the following.

Block 501: a malicious html file P1 is created in advance, the html file P1 contains codes for simulating a remote transmission attack and further includes a private directory address where the private file P2 is located in tested APP 101. The html file P1 is stored in any site device in the network.

Block 502: the test client 102 intercepts a data packet transmitted by tested APP 101, generates a response packet (which may also be referred to as a response message) corresponding to the data packet, puts a network address of the html file P1 in the response packet, and transmits the response packet to tested APP 101.

Block 503: if tested APP 101 successfully receives the response packet carrying the network address of the html file P1, tested APP 101 retrieves the network address of the html file P1 in the response packet, accesses and loads the html file P1 stored in the site device according to the network address, and starts to execute the codes in the html file P1.

Block 504: tested APP 101 tries to load the private file P2 according to the private directory address contained in the html file P1 through executing the html file P1, and to read the content of the private file P2.

According to various embodiments, in block 503, after tested APP 101 loads the html file P1 according to the network address, the method further includes where tested APP 101 displays a preconfigured page through executing some of the codes of the html file P1 and tries to load the private file P2 through executing the remaining codes of the html file P1. According to various embodiments, tested APP 101 postpones execution of the remaining codes (the codes for loading the private file P2) of the html file P1 for a predefined period of time. When the predefined period of time expires, block 404 is executed. Through displaying the preconfigured page, a more secret malicious attack can be simulated. Thus, the user cannot sense the attack of the html file P1 when loading the html file P1 for the first time.

Block 505: after successfully reading the content of the private file P2, tested APP 101 transmits a message carrying the content of the private file P2 to the test server. Further, if tested APP 101 does not successfully read the content of the private file P2, it may also transmit a message to the test server 103, indicating that it does not read the content of the private file P2. If any one of the blocks 502 through 504 is not successfully executed, tested APP 101 does not successfully read the content of the private file P2.

Block 506: the test server 103 receives a message from tested APP 101, determines whether tested APP 101 has read the content of the private file P2 through analyzing the message, and determines whether tested APP 101 has a security loophole.

The above examples of the present disclosure can simulate various kinds of attack behaviors and therefore may implement a complete test to the tested application.

Figure 6:
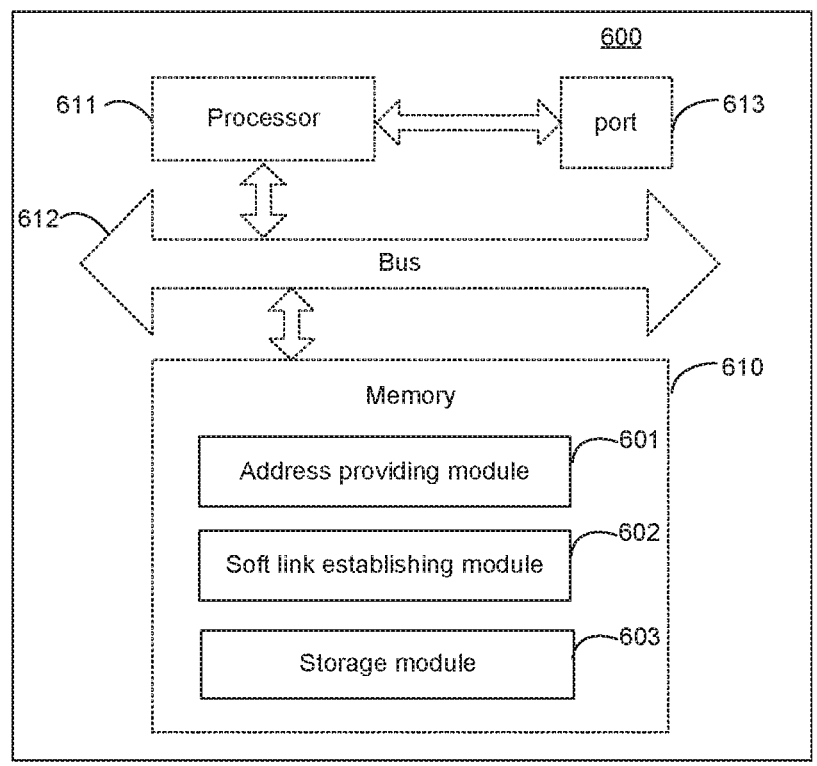
FIG. 6 is a block diagram illustrating a structure of a test client according to various examples of the present disclosure.

In accordance with the above method, some examples of the present disclosure provide a test client for an application. As shown in FIG. 6, the test client includes at least the following.

An address providing module 601 to attempt to provide a network address of a webpage file to a tested application. The webpage file is created in advance and includes codes for simulating a malicious attack which are executable by the tested application, wherein when the tested application loads the webpage file according to the address, the tested application attempts to read content of a private file in a private directory of the tested application through executing the codes contained in the webpage file. If the content of the private file is read, the tested application transmits a message carrying the content of the private file to a test server and the test server determines whether the tested application has a security loophole according to the message transmitted by the tested application.

According to various embodiments, the test client may simulate a local calling attack. At this time, the test client 600 is located in a local terminal device of the test application. The test client 600 further includes a storage module 603 to store the webpage file in a private directory of the test client 600, wherein an attribute of the webpage file is configured as writable, readable, and executable by a third party. At this time, the address providing module 601 attempts to call the tested application via an internal communication message of the operating system and to transmit the address of the webpage file to the tested application. The test client 600 further includes a soft link creating module 602 to delete, when the tested application loads the webpage file according to the transmitted address, the webpage file stored in the private directory of the test client 600, and create a soft link associating the private file to the webpage file via an operating system command according to the private directory address where the private file of the tested application is located, such that the tested application attempts to read the content of the private file according to the soft link through executing the codes in the webpage file.

According to various embodiments, when the tested application loads the webpage file according to the transmitted address, the tested application may further execute some of the codes to display a preconfigured page and postpone the execution of the remaining codes for a predefined period of time and, when the predefined time period expires, execute the remaining codes to load the address again, so as to load the private file and read the content of the private file according to the soft link. At this time, the soft link creating module 602 deletes, within the predefined time period, the webpage file saved in the private directory of the test client 600, and creates the above soft link.

According to various embodiments, the test client may simulate a remote transmission attack or an intermediate interception attack. At this time, the test client 600 is located in a remote terminal device of the tested application. The webpage file includes a private directory address where the private file of the tested application is located. The address providing module 601 attempts to transmit the address of the webpage to the tested application in case a remote transmission attack is simulated or in case an intermediate interception attack is simulated, to attempt to intercept a data packet transmitted by the tested application, generate a response packet corresponding to the intercepted data packet, put the address of the webpage file in the response packet, and attempt to transmit the response packet to the tested application. Through the above operations of the address providing module 601, the tested application may attempt to read the content of the private file according to the private directory address contained in the webpage file through executing the codes in the webpage file.

Further, various modules in the examples of the present disclosure may be integrated in one processing unit, or may be implemented as independent entities, or two or more modules may be integrated into one unit. The above integrated unit may be implemented by hardware or software functional unit.

According to various embodiments, the test client 600 may include a memory 610, a processor 611, a bus 612, and a port 613. The processor 611 and the memory 610 are coupled to each other via the bus 612. The processor 611 may transmit and receive data via the port 613 to implement network communications. The above modules 601 through 603 may be machine readable instruction modules stored in the memory 610. The processor 611 may execute machine readable instructions of the modules 601 through 603 stored in the memory 610 to realize the functions of the modules 601 to 603. When the address providing module 601 provides the address of the webpage file to the tested application in the remote device, the processor 611 executes the instructions in the address providing module 601 in the memory 610 to transmit the address to the tested application of the remote device via the port 613, or intercept a data packet transmitted by the tested application of the remote device and transmit the response packet carrying the address of the webpage file to the tested application of the remote device via the port 613.

In the test client 600, the functions of various modules 601 through 603 may be obtained from the above method examples, which are not repeated herein.

Figure 7:
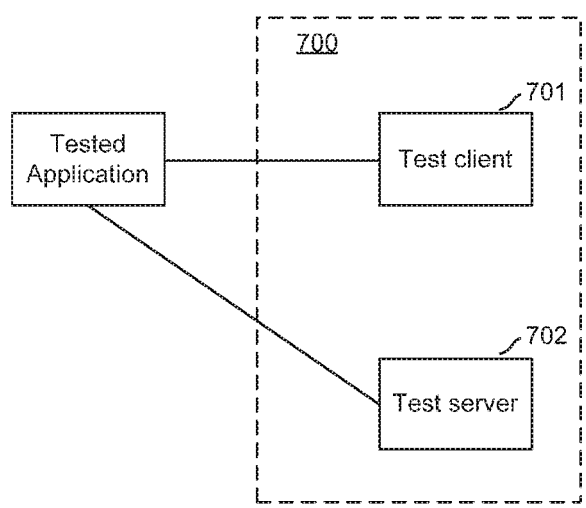
FIG. 7 is a block diagram illustrating a structure of a testing system according to various examples of the present disclosure.

Various embodiments of the present disclosure further provide a system for testing an application. As shown in FIG. 7, the testing system 700 includes a test client 701 and a test server 702. The application tested by the testing system 700 may be a browser or an application within a built-in browser component.

The test client 701 attempts to provide a network address of a webpage file to the tested application, wherein the webpage file is created in advance and includes codes for simulating a malicious attack and are executable by the tested application.

When loading the webpage file according to the address, the tested application attempts to read the content of a private file in a private directory of the tested application through executing the codes in the webpage file. If the content of the private file is read, the tested application transmits a message carrying the content of the private file to the test server 702 via a local terminal device.

The test server 702 determines whether the tested application has a security loophole according to the message transmitted by the tested application.

The detailed functions and implementations of the tested application, the test client 701, and the test server 702 have been described in the foregoing examples and are not repeated herein.

According to various embodiments, the testing system 700 may implement a batch test to a plurality of applications. For each application being tested, the method is similar to those described above. At this time, the testing system 700 may include a plurality of test clients 701, wherein each test client 701 attempts to transmit the address of the webpage file to any one of the tested applications. Each tested application attempts to read the content of the private file according to the address provided by the test client 701, and transmits a message to the test server 702. The test server 702 respectively determines whether a tested application has a security loophole according to the message transmitted by the tested application. Thus, the testing system 700 is able to implement parallelized tests to the plurality of applications via the test clients 701, which may further improve the test efficiency. The plurality of test clients 701 may be located in different physical devices.

Further, various embodiments of the present disclosure may be implemented by a data processing program executed by a data processing device such as a computer. Thus, the data processing program is within the protection scope of the present disclosure. Further, the data processing program is usually stored in a storage medium. It is possible to execute the program through directly reading the program from the storage medium or installing or copying the program in the storage device (such as hard disk or memory) of the data processing device. Thus, the storage medium is also within the protection scope of the present disclosure. The storage medium may be in various types, e.g., paper storage medium (e.g., tapes), magnetic storage medium (e.g., floppy disk, hard disk, flash, etc.), optical storage medium (e.g. CD-ROM, etc.), magnetic-optical storage medium (e.g. MO, etc.).

Various embodiments of the present disclosure further provide a storage medium, which stores a data processing program, the data processing program is used for executing any one of the methods provided by the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A method for testing an application, when the application is tested, the method comprises:

providing, by a test client, a network address of a webpage file to the tested application, wherein the tested application is a browser or an application with a built-in browser component, the webpage file includes codes for simulating a malicious attack, the codes including a first part of codes and a second part of codes;

when the tested application loads the webpage file according to the network address, the tested application executes the codes comprised in the webpage file to read content of a private file in a private directory of the tested application in a local terminal device where the tested application is located, including:

executing the first part of codes to display a preconfigured webpage and postponing execution of the second part of codes for a predefined period of time while the webpage file is being loaded;

creating a soft link during the predefined period of time according to the preconfigured webpage indicating a preconfigured address of the private file and the network address of the webpage file, the soft link associating the private file in the private directory of the tested application with the webpage file;

deleting the webpage file before the predefined period of time expires;

executing the second part of codes after the predefined period of time expires to load the network address again to redirect to the preconfigured address of the private file according to the soft link; and loading the private file according the preconfigured address; and when the tested application successfully reads the content of the private file, the tested application transmits a message carrying the content of the private file to a test server through the local terminal device, wherein the test server determines whether the tested application has a security loophole according to the message transmitted by the tested application.

2. The method of claim 1, wherein the test client and the tested application are both installed in the local terminal device, the method further comprising:

calling, by the test client, the tested application and transmitting the network address of the webpage file to the tested application via an internal communication message of an operating system, the internal communication message including an instant message.

3. The method of claim 1, wherein the test client is located in a remote terminal device remote from the tested application, the webpage file comprises a private directory address where the private file of the tested application is located;

the test client providing the network address of the webpage file to the tested application comprises:

transmitting, by the test client, the network address of the webpage file to the tested application, wherein the tested application reads the content of the private file according to the private directory address included in the webpage file through executing the codes.

4. The method of claim 1, wherein the test client is located in a remote terminal device remote from the tested application, the webpage file comprises a private directory address where the private file of the tested application is located;

the test client providing the network address of the webpage file to the tested application comprises:

intercepting, by the test client, a data packet transmitted by the tested application, generating a response packet corresponding to the intercepted data packet, the response packet carries the network address of the webpage file, and transmitting the response packet to the tested application, wherein the tested application reads the content of the private file according to the private directory address included in the webpage file through executing the codes.

5. The method according to claim 1, further comprising: creating the webpage file in a private directory of the test client, wherein the webpage file is writable, readable, and executable by a third party to enable loading of the webpage file by the tested application as the third party.

6. A test client for testing an application, wherein a tested application is a browser or an application with a built-in browser component, the test client comprises: a processor; a memory, storing instructions that, when executed by the processor, cause the processor to:

provide a network address of a webpage file to the tested application, the webpage file includes codes for simulating a malicious attack, the codes including a first part of codes and a second part of codes, wherein when the tested application loads the webpage file according to the network address, the tested application executes the codes included in the webpage file to read content of a private file in a private directory of the tested application in a local terminal device where the tested application is located, including:

executing the first part of codes to display a preconfigured webpage and postponing execution of the second part of codes for a predefined period of time while the webpage file is being loaded;

creating a soft link during the predefined period of time according to the preconfigured webpage indicating a preconfigured address of the private file and the network address of the webpage file, the soft link associating the private file in the private directory of the tested application with the webpage file;

deleting the webpage file before the predefined period of time expires; executing the second part of codes after the predefined period of time expires to load the network address again to redirect to the preconfigured address of the private file according to the soft link; and loading the private file according the preconfigured address; and when the tested application successfully reads the content of the private file, the tested application transmits a message carrying the content of the private file to a test server through the local terminal device, wherein the test server determines whether the tested application has a security loophole according to the message transmitted by the tested application.

7. The test client of claim 6, wherein the test client and the tested application are both installed in the local terminal device, and wherein the instructions further cause the processor to:

call the tested application and transmit the network address of the webpage file to the tested application via an internal communication message of an operating system, the internal communication message including an instant message.

8. The test client of claim 6, wherein the test client is located in a remote terminal device remote from the tested application, the webpage file includes a private directory address where the private file of the tested application is located;

the instructions further cause the processor to transmit the network address of the webpage file to the tested application, wherein the tested application reads the content of the private file according to the private directory address included in the webpage file through executing the codes.

9. The test client of claim 6, wherein the test client is located in a remote terminal device remote from the tested application, the webpage file comprises a private directory address where the private file of the tested application is located;

the instructions further cause the processor to intercept a data packet transmitted by the tested application, generate a response packet corresponding to the intercepted data packet, the response packet carries the network address of the webpage file, and transmit the response packet to the tested application, wherein the tested application reads the content of the private file according to the private directory address included in the webpage file through executing the codes.

10. A non-transitory computer readable storage medium, comprising instructions, the computer readable storage medium is located in a computer where a test client for testing an application is located, when the tested application is tested, the instructions, that are executed by the computer, cause the computer to:

provide a network address of a webpage file to the tested application, wherein the tested application is a browser or an application with a built-in browser component, the webpage file includes codes for simulating a malicious attack, the codes including a first part of codes and a second part of codes, when the tested application loads the webpage file according to the network address, the tested application executes the codes included in the webpage file to read content of a private file in a private directory of the tested application in a local terminal device where the tested application is located, including:

executing the first part of codes to display a preconfigured webpage and postponing execution of the second part of codes for a predefined period of time while the webpage file is being loaded;

creating a soft link during the predefined period of time according to the preconfigured webpage indicating a preconfigured address of the private file and the network address of the webpage file, the soft link associating the private file in the private directory of the tested application with the webpage file;

deleting the webpage file before the predefined period of time expires; executing the second part of codes after the predefined period of time expires to load the network address again to redirect to the preconfigured address of the private file according to the soft link; and loading the private file according the preconfigured address; and when the tested application successfully reads the content of the private file, the tested application transmits a message carrying the content of the private file to a test server through the local terminal device, wherein the test server determines whether the tested application has a security loophole according to the message transmitted by the tested application.

11. The non-transitory computer readable storage medium of claim 10, wherein the test client and the tested application are both installed in the local terminal device, and wherein the instructions further cause the computer to:

call the tested application and transmit the network address of the webpage file to the tested application via an internal communication message of an operating system, the internal communication message including an instant message.

12. The non-transitory computer readable storage medium of claim 10, wherein the test client is located in a remote terminal device remote from the tested application, the webpage file includes a private directory address where the private file of the tested application is located; the instructions further cause the computer to:

transmit the network address of the webpage file to the tested application, wherein the tested application reads the content of the private file according to the private directory address included in the webpage file through executing the codes.

13. The non-transitory computer readable storage medium of claim 10, wherein the test client is located in a remote terminal device remote from the tested application, the webpage file comprises a private directory address where the private file of the tested application is located; the instructions further cause the computer to:

intercept a data packet transmitted by the tested application, generate a response packet corresponding to the intercepted data packet, the response packet carries the network address of the webpage file, and transmit the response packet to the tested application, wherein the tested application reads the content of the private file according to the private directory address included in the webpage file through executing the codes.

* * * * *